Figure 1:
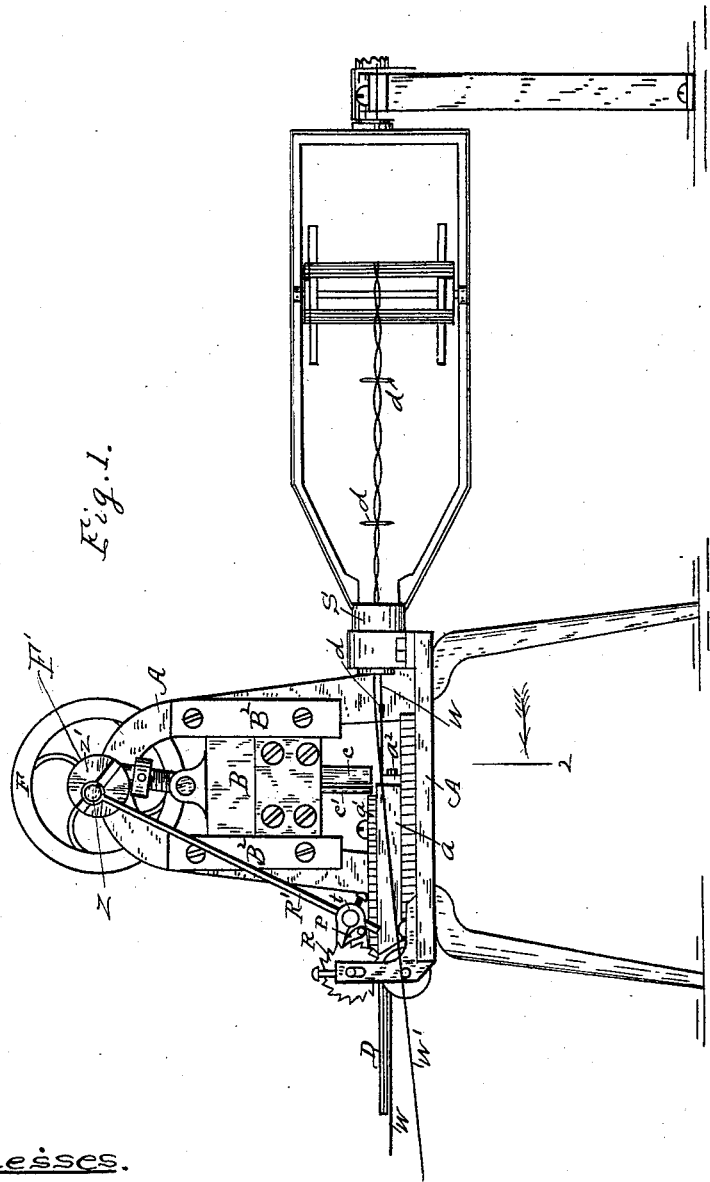

(No Model.)  2 Sheets—Sheet 1.

H. B. SCUTT.
WIRE BARBING MACHINE.

No. 280,676. Patented July 3, 1883.

Witnesses.
Thos. H. Hutchins.
Wm. J. Hutchins.

Inventor.
Hiram B. Scutt.

(No Model.) 2 Sheets—Sheet 2.
H. B. SCUTT.
WIRE BARBING MACHINE.
No. 280,676. Patented July 3, 1883.
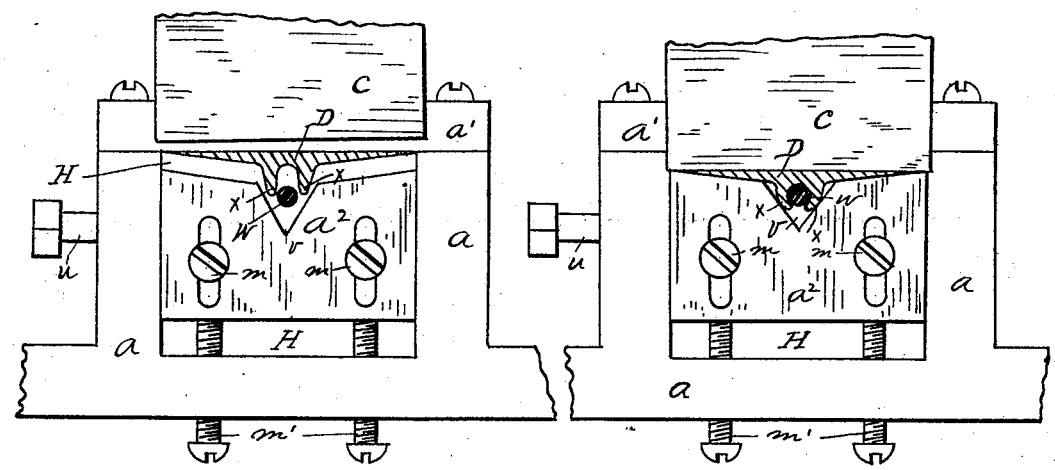
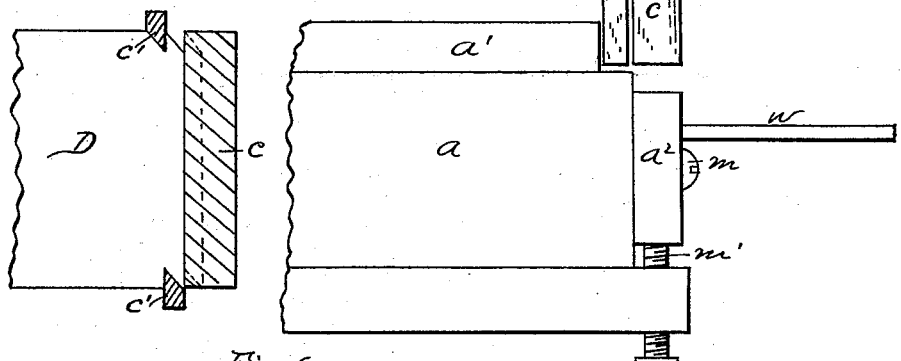
Witnesses.
Thos. H. Hutchins.
Wm. J. Hutchins.
Inventor.
Hiram B. Scutt.
N. PETERS, Photo-Lithographer, Washington, D. C.

UNITED STATES PATENT OFFICE.

HIRAM B. SCUTT, OF JOLIET, ILLINOIS.

WIRE-BARBING MACHINE.

SPECIFICATION forming part of Letters Patent No. 280,676, dated July 3, 1883.

Application filed May 11, 1883. (No model.)

*To all whom it may concern:*

Be it known that I, HIRAM B. SCUTT, a citizen of the United States of America, residing at Joliet, in the county of Will and State of Illinois, have invented certain new and useful Improvements in Wire-Barbing Machines, of which the following is a specification, reference being had therein to the accompanying drawings.

Figure 1 is a side elevation; Fig. 2, a vertical sectional view on line 2 of Fig. 1, looking in the direction of the arrow, against the face of cutting-die $c$, showing said die about to descend and shear off the end of the barb-strip D to form a barb; Fig. 3, a similar view, showing the die $c$ as it appears after having descended and cut off a barb; Fig. 4, a plan view on the top of the barb-strip, showing the position of the dies $c$ and $c'$, and the manner in which they shear off the barbs; Fig. 5, a side view of Fig. 2; and Fig. 6, a perspective view of the product of the machine, being the barb sheared off from the end of strip D and applied to the strand-wires.

The nature and object of this machine are to form barbs for wire fences by cutting them off from the end of a rolled thin strip of metal and attaching them to the strand-wires all at a single operation. The barb-strip is shown at D rolled so as to be about one inch wide, or wide enough to be long enough to make a barb when it is cut off from the end of the strip, and is in shape in cross-section as shown at D in Figs. 2 and 3.

Referring to the drawings, A represents the main frame of the machine, which supports a pair of vertical ways, $B^2$ $B^2$, or traversers, between which the sliding head B, containing the upper cutting-off dies, operates vertically in a reciprocating manner by means of a crank and pitman above, as shown in Fig. 1. The sliding head B carries the two dies $c'$ $c'$ and the die $c$. The die $c$ shears off the barb from the end of the barb-strip D, while the two dies $c'$ $c'$ cut out notches along the sides of the barb-strip, so as to leave points on each barb, as shown in Fig. 4. The view or Fig. 4 is a horizontal section through said dies, and shows their relative positions with each other. The barb-strip D enters the machine horizontally, as shown in Fig. 1, on the bed-plate H, (shown in Fig. 2,) which bed-plate conforms in shape to the barb-strip. This bed-plate H is so set with relation to die $c$ that it acts as the lower cutting-off die; or, in other words, the barb is cut off between the forward upper corner of said bed-plate and said die $c$ as it descends. The barb-strip D is fed in the machine by a ratchet-feed between a pair of feed-rollers operated by means of the ratchet R, pawl P, crank $t$, and pitman R′, which receives its reciprocating motion from a wrist-pin in the slot of the wheel $z'$ on the crank-shaft that operates the sliding head B. As said pitman R′ reciprocates it rotates the feed-rollers intermittently and feeds in the barb-strip D as fast as needed to make a barb at each feed. The bed-plate H has a channel, or, it may be, an aperture, its entire length, directly under the center of the barb-strip D, through which to pass the fence-wire $w'$, which emerges from said bed-plate at the locality shown at W in Figs. 2 and 3, between the two lugs $x$ $x$ of the barb, directly over the V-shaped depression in the upper surface of the forming-die $a^2$. When die $c$ descends and shears off a barb, it carries it downward onto the upper face of the forming-die $a^2$, which has its upper face shaped to conform to the shape of the barb, except at the center, where it is provided with the V-shaped channel to receive the two lugs $x$ $x$ of the barb. The die $c$ presses the barb down far enough so that the two lugs $x$ $x$ of the barb are driven down the converging sides of the channel $v$ over the strand-wire $w$ until the lugs $x$ $x$ are closed around under said strand-wire, as shown in Fig. 3, which firmly compresses and fastens the barb on said strand-wire, so that the barb is formed and attached to the strand-wire all at a single operation. Suitable mechanism, not necessary to be shown in detail, draws the strand-wire $w$ along the right distance to receive another barb in like manner. A second strand-wire, $w'$, is also passed into the machine at the mouth of the twister S, so that when the twister rotates it twists the two strand-wires $w$ and $w'$ together, so as to prevent any rotation of the barb on the strand-wire $w$. The twister and take-up of the barbed wire may be of any suitable pattern, and, as that part of the machine is no part of this invention, is shown no further than it is illustrated and shown in Fig. 1. At the same time when the barb is sheared off the end of the barb-strip the two dies $c'$ $c'$ (shown more particularly in Fig. 4) cut the edges of the barb-strip into notches similar to saw-teeth, as shown in said Fig. 4, and when the die $c$ cuts off a barb it cuts it on a line between said teeth, so that the single barb is left pointed at each end, as shown. The forming-die $a^2$ is adjustable by means of the set-screws $m$ and $m'$.

Fig. 6 illustrates the product of the machine, it being a section of a strand of finished barbed wire. The bed-plate H lies in the frame $a$ $a$, and is covered by the plate $a'$ to hold it in position.

The power is applied to the machine by a belt on the band-wheel or pulley F', Fig. 1, on the crank-shaft with the fly-wheel F.

Having thus described my invention, what I claim as new, and desire to secure by Letters Patent, is as follows, to wit:

1. The combination of the frame A, reciprocating sliding head B, cutting-off dies $c$ $c'$ $c'$, bed-plate H, provided with a channel or aperture for wire $w$, and forming-die $a^2$, having the V-shaped groove across its upper face, all adapted to operate as and for the purpose set forth.

2. The combination of the cutting-off die $c$, bed-plate H, having a longitudinal groove or aperture for wire $w$, and having its upper face conformed in shape to the lower surface of barb-strip D, and the forming-die $a^2$, adapted to close the lugs $x$ $x$ of the barb around the strand-wire $w$, to fasten it thereon, as and for the purpose set forth.

3. In a wire-barbing machine, the combination of a cutting-off die, $c$, and a suitable bed for holding the barb-strip D while the barb is being cut off, with a forming-die, $a^2$, adapted to close the lugs $x$ $x$ of the barb around and on the strand-wire $w$, as and for the purpose set forth.

HIRAM B. SCUTT.

Witnesses:
THOS. H. HUTCHINS,
WM. J. HUTCHINS.